A. M. MORRISON.
ANTISIPHONING TRAP.
APPLICATION FILED JAN. 28, 1909.
988,369.
Patented Apr. 4, 1911.
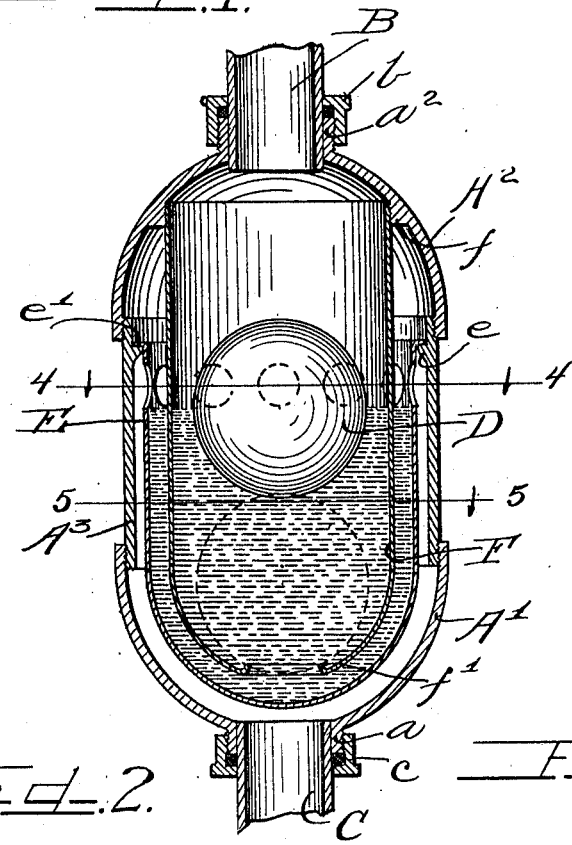
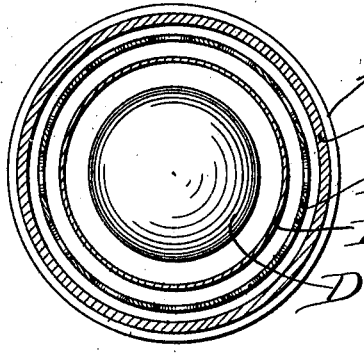
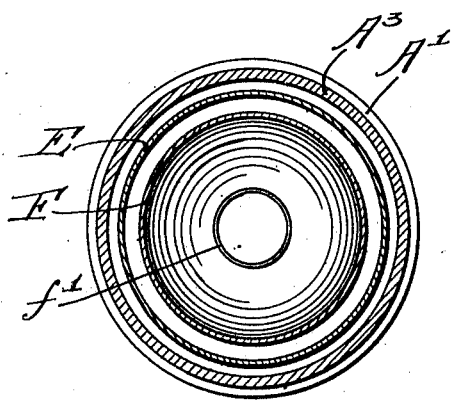

UNITED STATES PATENT OFFICE.

ANDREW M. MORRISON, OF DUBUQUE, IOWA.

ANTISIPHONING TRAP.

988,369.   Specification of Letters Patent.   Patented Apr. 4, 1911.

Application filed January 28, 1909. Serial No. 474,688.

*To all whom it may concern:*

Be it known that I, ANDREW M. MORRISON, a citizen of the United States, and a resident of the city of Dubuque, in the county of Dubuque and State of Iowa, have invented certain new and useful Improvements in Antisiphoning Traps; and I do hereby declare that the following is a full, clear, and exact description of the same, reference being had to the accompanying drawings, and to the letters of reference marked thereon, which form a part of this specification.

Heretofore it has been a very common fault with traps for fluid distribution that, unless carefully revented to afford a very free inflow of air, the flushing of, or discharge from one fixture acts to drain or siphon the sealing fluid out of the other traps. This permits the escape of sewer gas through the traps thus rendered useless, greatly endangering the health of those occupying the premises. Inasmuch as the traps affected may be at considerable distances from that flushed, no warning is given of the loss of sealing fluid and in such imperfectly vented systems, it rarely happens that any of the traps act to exclude sewer gas and other emanations from the sewer. Many attempts have been made to overcome this difficulty and for this purpose traps sealed in part by fluids other than that discharged through the trap have been devised. Mercury has been sometimes used for this purpose, thereby not only increasing considerably the expense of the construction, but also necessitating frequent inspections to enable the user to ascertain if the trap is successfully operating. Such traps have never heretofore been entirely reliable or satisfactory. Furthermore, practically all traps heretofore constructed soon become useless by evaporation of their contents, destroying the seal unless often flushed.

The object of this invention is to afford an antisiphoning trap of exceedingly cheap, simple and durable construction and which cannot get out of repair and in which siphoning of contents of the trap to empty the same is absolutely impossible under any and all conditions.

It is a further object of the invention to afford a construction permitting easy and quick installation, and which operates at all times positively to seal the trap from siphoning but permits a free flow of the fluid therethrough during the normal operation of the trap and also prevents all loss of the sealing fluid by evaporation.

The invention consists in the matters hereinafter described and more fully pointed out and defined in the appended claims.

On the drawings: Figure 1 is a vertical section of a bottle trap embodying my invention. Fig. 2 is a section taken on line 4—4 of Fig. 1. Fig. 3 is a section on line 5—5 of Fig. 1.

As shown in the drawings: In the bottle trap shown in Figs. 1, 2, and 3, the receptacle or casing comprises a lower and an upper hemisphere end section $A'$—$A^2$, internally threaded at the open end and provided centrally with an axially apertured externally threaded boss $a$—$a^2$, as before described, to receive the outlet pipe C, and the inlet pipe B, respectively, the latter of which extends inwardly sufficiently to afford an upper seat for the ball D, to prevent back flow. Follower nuts $c$—$b$, are threaded on the bosses as before described. The middle portion of the casing is formed of a pipe section $A^3$, externally threaded at the ends to engage in the end sections. This also may be of cast metal, if preferred.

Supported on a peripheral ring or shoulder $e$, near the top of the casing section $A^3$, by means of a peripheral flange $e'$, is a cup E, of metal, either cast or pressed, which is sufficiently smaller than the casing to afford an open space surrounding the same and which extends to near the bottom of the casing. Said casing is provided with closely arranged apertures around the top thereof opening into the casing.

Threaded into a suitable flange $f$, in the upper casing member $A^2$, axially thereof, is a cup F, which extends to near the bottom of the cup E, affording considerable space between the same and the sides of said cup E, and beneath the bottom, and said bottom is provided with a central aperture therethrough surrounded by a raised seat $f'$, on which the ball D, seats when the sealing fluid is drawn down from any cause.

The operation is as follows: The sealing fluid in the trap extends to a height to permit the water or other sealing liquid to remain in, and fill the receptacle to near or above its middle. The fluid thus supports the ball at all times near the middle of the receptacle. Said ball affords no obstruction to inflowing water or fluid, though it is sufficiently light to be supported from seating as the fluid passes through the trap, thereby permitting a free flow so long as the level of the liquid within the receptacle is maintained approximately at the same height as its maximum level in the trap C, or cup E. When, however, the level of the liquid is reduced but slightly, as for instance, when the trap begins to siphon, the ball immediately descends upon, and seats to close the discharge aperture, as shown in dotted lines in Fig. 1, completely sealing the same. Obviously, the greater the tendency to siphon, the more firmly will the ball seat, affording a positive valve to break the siphon and prevent any material lowering of the level of the fluid in the receptacle. When the siphon breaks, however, the buoyancy of the ball (due in part to its greater size relative to the discharge aperture and also the slight back flow into the receptacle from the trap tending to restore a level in the receptacle approximating the normal level in the trap) causes the ball to instantly rise to its former position.

The ball serves the double purpose of positively sealing to prevent siphoning of the trap at all times and under any and all conditions and also positively seals the trap to prevent the loss of sufficient of the sealing fluid by evaporation to unseal the trap. This last mentioned result follows from the fact that should any evaporation occur the ball must seat upon the outlet before the seal is broken, thereby closing the same and insuring the retention of sufficient water in the trap to prevent any emanations therefrom. Obviously back flow or flooding is at all times prevented by the sealing of the ball on the end of the inlet pipe B, which extends into the casing for that purpose. Thus an ideal construction is afforded which under all conditions prevents siphoning, the loss of the seal through evaporation and also prevents flooding by back flow. Furthermore, an exceedingly cheap and simple trap is afforded, easy and cheap to manufacture, assemble and install.

Of course, the trap I have shown is merely illustrative for it is obvious that traps of any suitable form such as one-half or quarter S, or P traps, may be used as effectively as the forms of traps shown—in fact, the receptacle may assume any desired form, ornamental or otherwise; may be constructed of any desired size, and the ball or other floating body within the receptacle may be of any material suitable for the purpose. I, therefore, do not purpose limiting this application for patent otherwise than necessitated by the prior art, as many details of construction may be varied without departing from the principles of my invention.

I claim as my invention:

1. A trap comprising a casing having an interior threaded flange and a supporting shoulder, a cup threaded at its upper end in said threaded flange and open at its lower end, an interior seat around the aperture, a float ball in the cup adapted to seat on said seat and a cup disposed between said cup and the casing having a peripheral flange to rest on the supporting shoulder, said cup apertured below the flange.

2. In a device of the class described a casing, an interior threaded flange therein, a supporting shoulder beneath the threaded flange in said casing, a plurality of interfitting cups in the casing, an inner cup threaded at its upper end in the threaded flange in the casing, another cup supported upon the shoulder below the threaded flange, the inner of said cups having an outlet in its bottom, an upturned seat surrounding said outlet and peripheral apertures below the top of the outer cup to allow discharge.

3. In a trap, a casing comprising end sections and a middle section, a threaded flange in one of the end sections and a supporting shoulder in the middle section a cup threaded on the flange of the end section and having an opening at the bottom and a seat formed at the opening, a cup supported by the shoulder within the middle section adapted to receive the aforesaid cup therein and provided with apertures in the side thereof at the top and a buoyant closure in the cup secured to the end section.

In testimony whereof I have hereunto subscribed my name in the presence of two subscribing witnesses.

ANDREW M. MORRISON.

Witnesses:
C. W. HILLS,
J. W. ANGELL.

Copies of this patent may be obtained for five cents each, by addressing the "Commissioner of Patents, Washington, D. C."